US012118919B2

(12) United States Patent
Thielemans et al.

(10) Patent No.: US 12,118,919 B2
(45) Date of Patent: Oct. 15, 2024

(54) STANDALONE LIGHT-EMITTING ELEMENT DISPLAY TILE AND METHOD

(71) Applicant: STEREYO BV, Nazareth (BE)

(72) Inventors: Robbie Thielemans, Nazareth (BE); Vince Dundee, Glendale, CA (US)

(73) Assignee: Stereyo BV, Nazareth (BE)

( * ) Notice: Subject to any disclaimer, the term of this patent is extended or adjusted under 35 U.S.C. 154(b) by 95 days.

(21) Appl. No.: 17/053,951

(22) PCT Filed: May 8, 2019

(86) PCT No.: PCT/EP2019/061804
§ 371 (c)(1),
(2) Date: Nov. 9, 2020

(87) PCT Pub. No.: WO2019/215219
PCT Pub. Date: Nov. 14, 2019

(65) Prior Publication Data
US 2021/0225267 A1    Jul. 22, 2021

Related U.S. Application Data

(60) Provisional application No. 62/668,521, filed on May 8, 2018.

(30) Foreign Application Priority Data

Oct. 4, 2018 (EP) ..................... 18198749

(51) Int. Cl.
G09G 3/32      (2016.01)
G06F 3/14      (2006.01)
G06F 3/147     (2006.01)

(52) U.S. Cl.
CPC ......... *G09G 3/32* (2013.01); *G09G 2300/026* (2013.01); *G09G 2360/04* (2013.01);
(Continued)

(58) Field of Classification Search
CPC ......... G09G 2370/04; G09G 2360/04; G09G 2300/026; G06F 3/1446
See application file for complete search history.

(56) References Cited

U.S. PATENT DOCUMENTS 7,015,902 B2 *  3/2006  Nagai ................. G09G 3/32
                                                  345/98
7,777,691 B1 *  8/2010  Nimmer .............. G06F 3/1446
                                                  345/1.3
(Continued)

FOREIGN PATENT DOCUMENTS

GB          2469819 A     11/2010

OTHER PUBLICATIONS

International Search Report and Written Opinion from PCT Application No. PCT/EP2019/061804, Jun. 13, 2019.
(Continued)

*Primary Examiner* — William Boddie
*Assistant Examiner* — Bipin Gyawali
(74) *Attorney, Agent, or Firm* — Workman Nydegger

(57) ABSTRACT

A standalone light-emitting element display tile, such as for instance a light-emitting diode display tile and method is disclosed. The standalone light-emitting element display tile can be a lighting fixture, an image display device, and/or a video display device. The standalone light-emitting element display tile includes a portable board having any arrangement of light-emitting elements thereon, a control module, and a power module. In one embodiment, the standalone light-emitting element display tile is a fully autonomous and independent light-emitting element display tile that features wireless communications and battery power, wherein there are no signal cables or power cables connected to the standalone light-emitting element display tile. Further, a
(Continued)

method of using the presently disclosed standalone light-emitting element display tile is provided.

22 Claims, 10 Drawing Sheets

(52) U.S. Cl.
CPC ..... *G09G 2370/06* (2013.01); *G09G 2370/16* (2013.01); *G09G 2380/06* (2013.01)

(56) References Cited

U.S. PATENT DOCUMENTS

| | | | | |
|---|---|---|---|---|
| 9,069,519 | B1* | 6/2015 | Hall | G06F 3/147 |
| 2002/0163513 | A1* | 11/2002 | Tsuji | G09G 5/006 |
| | | | | 345/204 |
| 2005/0116667 | A1* | 6/2005 | Mueller | G09F 19/22 |
| | | | | 315/312 |
| 2005/0128751 | A1* | 6/2005 | Roberge | G06F 3/1446 |
| | | | | 362/276 |
| 2007/0241988 | A1* | 10/2007 | Zerphy | G06F 3/1446 |
| | | | | 345/1.3 |
| 2008/0165081 | A1 | 7/2008 | Lawther et al. | |
| 2009/0009103 | A1 | 1/2009 | McKechnie et al. | |
| 2013/0181884 | A1* | 7/2013 | Perkins | G09F 9/3026 |
| | | | | 345/1.3 |
| 2014/0302773 | A1* | 10/2014 | Jantunen | H04N 21/25825 |
| | | | | 455/3.01 |
| 2015/0287390 | A1* | 10/2015 | Kakeko | H04L 61/5038 |
| | | | | 345/1.1 |
| 2017/0032715 | A1* | 2/2017 | Sutherland | B25J 9/0084 |
| 2018/0060014 | A1* | 3/2018 | Son | G09G 3/2092 |

OTHER PUBLICATIONS

Extended European Search Report from corresponding EP Application No. EP18198749.6, Nov. 12, 2018.

International Preliminary Report on Patentability from PCT/EP2019/061804, Jul. 10, 2020.

Zhang, Yin, "Performance Characteristics of Lithium Coin Cells for Use in Wireless Sensing Systems, " All Theses and Dissertations, Brigham Young University, BYI Scholars Archive, Jun. 17, 2012, 143 pages.

Office Action from European Application No. 19722133.6, Jan. 19, 2023.

* cited by examiner

Plot 400

STANDALONE LIGHT-EMITTING ELEMENT DISPLAY TILE AND METHOD

TECHNICAL FIELD

The presently disclosed subject matter relates generally to light-emitting diode (LED) display technology and more particularly to a standalone LED display tile and method. In a broader sense, the invention relates to display technology using or based on light-emitting elements (such as LEDs but also including OLEDs and QLEDs for instance) and more particularly to a standalone display tile using or based on such light-emitting elements and method.

BACKGROUND OF THE INVENTION

Electronic displays, such as LED displays, are often used to display advertising content. For example, electronic displays are used in traditional point-of-sales environments, such as storefronts and shopping malls, to display advertising content. LED displays, for example, are designed to process digital information, such as streaming video. However, systems that support LED displays can be expensive, complex, and difficult to manage. For example, an LED display system may include a playout server, a media player, a computer, a network connection, and a myriad of cables for interconnecting and powering all the components. Therefore, new approaches are needed for showing advertising content that are simple and low cost.

Accordingly, the aim of the invention is to provide a display system and method that resolves the shortcomings of the solutions described above.

SUMMARY OF THE INVENTION

In a first aspect of the invention, a display system is provided being capable for standalone operating and comprising a portable board and an arrangement of a plurality of light-emitting elements onto the portable board, for example being arranged in an array herewith defining the display. The arrangement of a plurality of light-emitting elements is provided onto the board, as well as an associating plurality of light-emitting element drivers is provided thereon, for driving the light-emitting elements such that one single light-emitting driver is assigned for each of the plurality of light-emitting elements. The display system further comprises a control module also provided or mounted onto the portable board for providing for instance all necessary control instructions for the drivers, and hence controlling the light-emitting element drivers. The display system also comprises a power module foreseen onto the portable board for supplying power, e.g. all necessary or required, to the plurality of light-emitting element drivers on one hand and to the control module on the other hand, more in particular for instance to the active parts of the control module. The capability for standalone operating of the display system implies that a processor otherwise needed for submitting the video or images in one or another way to the display system, by means of one or another protocol, and in general being rather expensive, is no longer necessary. The video or images can be directly stored for instance onto the display system. The standalone aspect can moreover increase the interactivity of the display system. Amongst applications in the field can be mentioned for instance large stadium events such as sports games or concerts, fixed install applications e.g. advertisement, and the rental and staging business. In an embodiment of the invention an entirely standalone version of the display system is defined, consisting (essentially of) the above referred features.

According to an embodiment, the control module of the display system comprises of a means for board communication connectable to the plurality of light-emitting element drivers, a data storage module, more in particular a non-volatile data storage module wherein e.g. video files and/or images are stored, and a controller being adapted for controlling the means for board communication as well as for controlling the data storage module. The means for board communication may comprise a buffer module and a board interface connected thereto. The control module may further comprise a communications interface, providing wireless communications and the controller may be further adapted for controlling the communications interface. Moreover, the control module may be adapted for being in communication via the communications interface with a remote control device for receiving control data for use by the controller and/or to be stored into the data storage module.

In an embodiment of the invention the display system has a control module, more in particular comprising a controller, being adapted for being temporarily in communication via the communications interface with an external processing device or module for loading data into the data storage module, herewith storing the to be displayed data. Such to be displayed data being for example digital video files, digital image files, lighting scheme files, can further optionally also include digital audio files and further optionally any type of control data for the controller.

In a preferred embodiment the control module of the display system, even more in particular the controller thereof, is adapted for handling such temporarily communication via the communications interface with the external processing device or module, when the external processing device or module is a general purpose processing device. By means of example such general purpose processing device is for instance any mobile computing device, such as a mobile phone (e.g. a smartphone), a smartwatch, a tablet device, a laptop computer, or the like. Preferably the adaptations foreseen in the controller, for being adapted for handing such temporarily communication, may provide handling of such temporarily communication for a plurality of different general purpose processing devices.

According to an embodiment, the power module of the display system comprises of an energy storage module such as a battery system, being all or not rechargeable. According to a particular embodiment, in addition to the battery system, photovoltaic cells are also provided on the display system, for additionally charging the battery system. Such photovoltaic cells are for instance mounted in between the light-emitting elements.

In an embodiment of the invention, the display system capable for standalone operating further comprises (one or more) other technology module(s) used in combination with the lighting and/or display functionality of the display system and the control module. More in particular, the controller may be adapted particularly for operating the (one or more) other technology module(s). As an example, the other technology module can be an audio system, whereas the data storage module then being further adapted for storing digital audio files. The other technology module can also be a robotics or motorized system, whereas the data storage module then being further adapted for storing motor control data. Moreover, the controller then being adapted for instance for controlling the movement of a (motorized) robotic arm or motor while using the motor control data in coordination with video or image data (and optionally audio playing) from the data storage module running on the display system.

According to an embodiment, the display system comprises a housing, frame or body encapsulating the different parts or modules. Such housing may be particularly designed for the application, and for example is made of just one or two pieces (e.g. back and/or cover) in order to create a rather plain and smoothly finished display system (e.g. having rounded corners), such as for instance a light-emitting diode (LED) display tile. By means of example, an application where nicely finished tiles are wanted is for instance a large stadium event such as a sports game e.g. football, soccer or a concert, where a few hundred or thousands of people in the audience are holding a tile, all together representing a video or image run thereon. Depending on the setup and hence how people are standing, sitting or located in general, the way of presenting the video or image, or lighting effect can be adapted. Further, as an example, the video or image can be stored in advance within the tile, and can be played whenever the tile is activated by means of a start or push button. The tile itself thus comprises the content, and hence can be played out standalone. Besides a start or push button, the tile may also comprise one or more other action buttons, such as for example a voting button whenever tiles would be used in an environment where voting can take place. Television shows, such as e.g. talent shows or contests could be thought of in this respect, where the audience holding a tile can also vote for their favorite artist or bring out their opinion, or respond in general to a question posed. A wireless receiver, or transceiver (e.g. for confirming receipt), at least reacting to a synchronization signal can be provided in each tile, enabling triggering of each tile for showing the right content. Having receiver and transmitter, or transceiver provided, the transmitting channel could also be used for transmitting to other display tiles within a display setup comprising multiple display tiles. By means of an algorithm, the transmitter or transceiver system could find out where which tile is at any time. A computer could process this information real-time, such that the content to be played can be mapped dynamically, even when people in an audience are moving position, i.e. for example walking and continuously moving amongst each other. Having a battery system provided, all or not rechargeable, the tile can be powered in a wireless manner. The memory size for data storage of e.g. video or images to be stored and played out is depending on the number of light-emitting elements, the number of colors, possible compression techniques and the market or application in particular, for which the tiles or display system has to be built. A video of 15 seconds for instance could suffice as gadget, whereas for fixed install e.g. advertisement 1 hour of video would probably be more applicable. The format of the content on the tile can be either the entire video or else only part of it that will be shown on the tile in particular will be stored. It speaks for itself that systematically sharing, splitting and combining of video or images, will be required and hence the invention also relates to methods for suitable handling of data such as video or images for being used on the tiles in accordance with the invention, more in particular ensuring a data size adapted to the data storage module size. In addition, the colors of the light-emitting elements could be adapted dynamically depending on the content of the video or images, by means of a color calibration technique, giving the impression that much deeper saturated colors can be seen.

According to an embodiment, the display system comprises a gyroscope, also known as gyro, wherein for example position coordinates (e.g. x, y, z) and rotation can be read out and interpreted. As an example, a large virtual image could be stored within a display tile, and depending on the movement of the tile part of the virtual image is scanned and shown on the tile, e.g. in real-time with the movement. Furthermore, as an example, such virtual image could be for instance a panoramic picture being scanned and viewed from left to right and vice versa onto the tile, because of movement of the tile for example due to a person holding the tile is moving or turning with the tile from left to right and vice versa. Other gimmicks to be mentioned could be for example a water level with image (either taken with camera, or stored), or a selfie application based on a selfie picture initially taken with the smartphone, and then wirelessly uploaded to the tile. A person than turning and moving the tile towards itself could for instance scan himself or herself with the tile. A more significant degree of interactivity hence comes to surface, having interactive content to be shown on a display tile, even when such content is not preprocessed at all.

In a second aspect of the invention, a single-tile configuration is provided comprising of a display system in accordance with first aspect of the invention, more in particular in accordance with the particular embodiments thereof wherein the control module comprises a communications interface, providing wireless communications. The single-tile configuration further comprises a remote control device for providing control data to the display system, being in wireless communication with the remote control device.

In a third aspect of the invention, a single-tile configuration is provided comprising of a display system in accordance with first aspect of the invention, more in particular in accordance with the particular embodiments thereof wherein the control module comprises a communications interface, providing wireless communications. The single-tile configuration further comprises an external processing device or module, and the display system being in wireless communication with the external processing device or module to wirelessly transmit video data (and/or audio and/or control data) to the data storage module of the control module.

In a fourth aspect of the invention, a single-tile configuration is provided consisting of a display system in accordance with first aspect of the invention, more in particular in accordance with the particular embodiments thereof wherein the control module comprises a communications interface, providing wireless communications. The single-tile configuration further comprises an external processing device or module, and the display system being in wireless communication with the external processing device or module to wirelessly transmit video data (and/or audio) and control data to the data storage module of the control module.

In a fifth aspect of the invention, a multiple-tile configuration is provided comprising of multiple display systems in accordance with first aspect of the invention, more in particular in accordance with the particular embodiments thereof wherein the control module comprises of a means for board communication connectable to the plurality of light-emitting element drivers, a data storage module, and a controller, adapted for controlling the means for board communication and the data storage module. The multiple-tile configuration further comprises one or more remote control devices and/or one or more external processing devices or modules, each being in wireless communication.

According to an embodiment, at least one of the multiple display systems of the multiple-tile configuration in accordance with fifth aspect, is adapted to wirelessly transmit synchronization signals to at least one other of the multiple display systems, being further adapted to wirelessly receive such synchronization signals. More in particular, the at least one of the multiple display systems, wirelessly transmitting, is adapted for operating as master tile amongst the other of the multiple display systems being determined as slave tiles, and wirelessly receiving. The appointment of a master tile may change in time. In fact, any tile could be appointed as new master whenever the old one comes into failure. Vice versa, any tile could also be appointed as slave tile. As a consequence of such backup when failure of a master occurs, synchronization can continuously be provided because of the fact that a master and its slaves may always be provided.

In a further aspect of the invention, a method is provided for using a display system capable for standalone operating, in accordance with first aspect of the invention. The method comprises the steps of (i) providing one or multiple display systems; (ii) loading the one or multiple display systems with data; (iii) selecting the data to be displayed, or to be rendered in general, and then initiating playout; and (iv) suspending the data that is being displayed or rendered.

In an embodiment of such method, one display system capable for standalone operating is provided according to a single-tile configuration in accordance with second, third or fourth aspect of the invention.

In another embodiment of such method, multiple display systems capable for standalone operating are provided according to a multiple-tile configuration in accordance with fifth aspect of the invention.

In summary the invention relates to a display system, also denoted display tile, as the size of the related board is selected to be portable, typically a tile size. The invention moreover relates to a board with light-emitting elements mounted thereon. Such light-emitting elements can be classic LEDs (light-emitting diodes) but also LEDs of an alternative kind such as OLEDs (organic LEDs), QLEDs (quantum dot LEDs), COB LEDs (chip on board LEDs) can be used.

The invention relates to a kind of the above display systems, which are adapted and/or arranged and/or capable for standalone operating, meaning for operating fully autonomously in terms of connections outside the system and/or independently in terms of operational logic, preferably both autonomous and independence is provided. It is worth emphasizing that such displays can hence operate in the above-indicated modes (autonomy and/or independence) but in some embodiments do not need to. More in particular, means to connect to outside the system and/or operate under control of external systems might be provided also. The adaptations and/or arrangement are however so that all necessary elements to support the indicated modes are present with the system.

The invention relates to a standalone display system, wherein one single display tile is acting entirely standalone on its own, but also wherein alternatively multiple display tiles of the same kind or type (e.g. all LED, or OLED, or QLED) are cooperating as one single standalone screen comprising of those multiple display tiles.

The invention further relates to computer program products, operable either on the controller of said tile and/or a processing engine, being part of an external device, for executing any of the steps of the methods discussed above and a non-transitory machine-readable storage medium storing the computer program product. The invention further relates to databases, compiled to be operable on a computer environment and adapted for tracking the tiles and storing information related to which data is to be displayed on which tile.

BRIEF DESCRIPTION OF THE DRAWINGS

The features and advantages of the present invention will be more clearly understood from the following description taken in conjunction with the accompanying drawings, which are not necessarily drawn to scale.

DETAILED DESCRIPTION OF THE INVENTION

In some embodiments, the presently disclosed subject matter provides a standalone light-emitting element display tile, e.g. a standalone LED, OLED or QLED display tile and method. The presently disclosed standalone light-emitting element display tile can be used, for example, as a lighting fixture (e.g. for backlighting and/or lighting effects applications), an image display device, and/or a video display device. The standalone light-emitting element display tile includes a light-emitting element board (e.g. a LED, OLED or QLED board) having any arrangement of light-emitting elements thereon, a control module, and a power module. In one embodiment, the standalone light-emitting element display tile is a fully autonomous and independent light-emitting element display tile that features wireless communications and battery power, wherein there are no signal cables or power cables connected to the standalone light-emitting element display tile.

A main feature of the presently disclosed standalone light-emitting element display tile is that it does not require the continuous presence and/or use of an external processing device/module. For example, in some embodiments, the standalone light-emitting element display tile is in communication with an external processing device/module for loading its content only, wherein once the content is loaded the standalone light-emitting element display tile is no longer required to be in communication with the external processing device/module; namely, standalone operation ensues.

The presently disclosed standalone light-emitting element display tile can operate in single-tile configurations or multiple-tile configurations. In some embodiments, the standalone light-emitting element display tile can operate as a lighting fixture and be programed with certain lighting schemes and/or lighting effects. In some embodiments, the standalone light-emitting element display tile can operate as a digital display for displaying digital image content and/or digital video content. Further, the presently disclosed standalone light-emitting element display tile can operate as a handheld and/or wearable display device and/or lighting fixture.

Further, any type of information can be used by the control module of presently disclosed standalone light-emitting element display tile. For example, the control module can be used to store and process video information, image information, lighting scheme information, audio information, control information, and/or any other type of information. An example of other type of information is control information for controlling and/or steering robotics (e.g. a robotic arm in projection systems).

Figure 1:
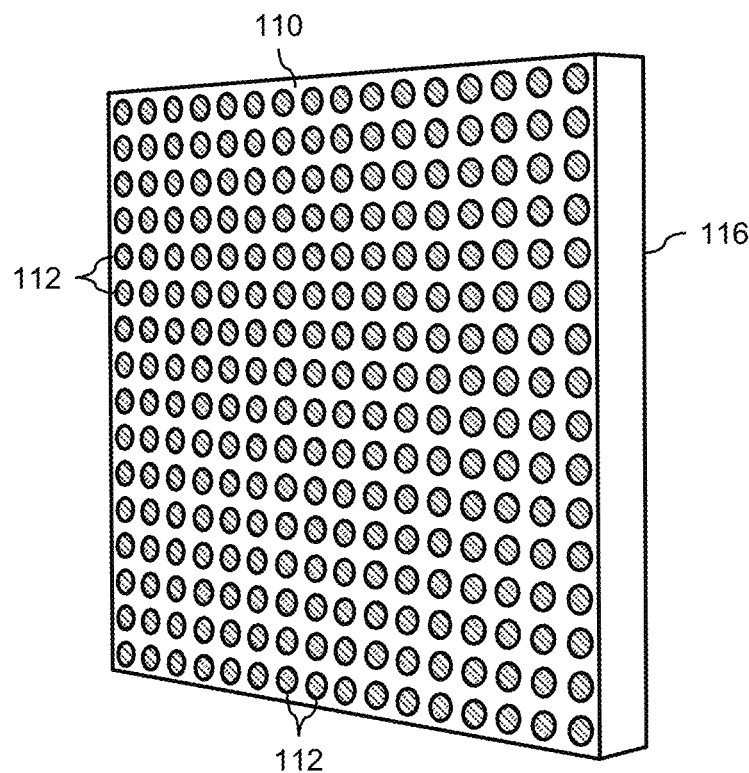
FIG. 1 and FIG. 2 illustrate a front perspective view and a rear perspective view, respectively, of an embodiment in accordance with the invention, more in particular an example of the presently disclosed standalone light-emitting element display tile, such as a standalone LED display tile is shown.
Figure 2:
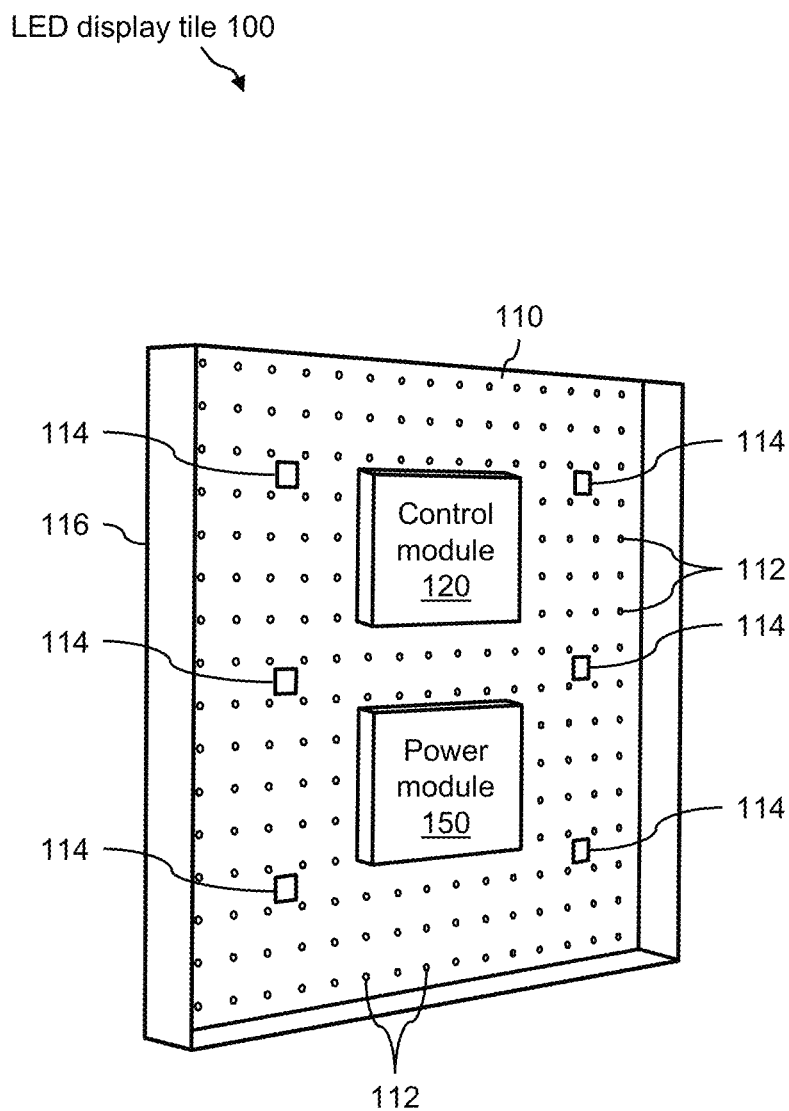

FIG. 1 and FIG. 2 illustrate a front perspective view and a rear perspective view, respectively, of an example of the presently disclosed standalone light-emitting element display tile 100, such as e.g. a standalone LED display tile 100 (hereafter call LED display tile 100). LED display tile 100 can be used, for example, as a lighting fixture (e.g. for backlighting and/or lighting effects applications), an image display device, and/or a video display device. Further, LED display tile 100 is easily portable or can be used as a fixed display device and/or lighting fixture. Further, LED display tile 100 can operate as a handheld and/or wearable display device and/or lighting fixture.

LED display tile 100 includes an LED board 110 that supports an arrangement of LEDs 112 and a plurality of LED drivers 114, wherein LED drivers 114 are mounted on the back of LED board 110. LED board 110 is mounted in a frame or body 116. Further, LED display tile 100 includes a control module 120 and a power module 150. Control module 120 and power module 150 are installed in frame or body 116 behind LED board 110.

In the example shown in FIG. 1 and FIG. 2, LED board 110 supports a 16×16 array of LEDs 112, set on a pitch of, for example, about 20 mm×about 20 mm. In this example, LED display tile 100 may be considered a low-resolution display. Further, LEDs 112 (or pixels) can be RGB LEDs (or RGB pixels), white LEDs (or white pixels), or any color LEDs (or any color pixels). LED drivers 114 can be standard LED drivers for distributing control information from control module 120 to each of the LEDs 112.

The 16×16 array of LEDs 112 shown in FIG. 1 and FIG. 2 is exemplary only. LED board 110 can include any arrangement of LEDs 112; namely, any number and any array of LEDs 112, and set on any pitch ranging, for example, from about 2 mm to about 40 mm. For example, LED display tile 100 can be from 1 pixel per tile to a 500×500 pixel array per tile. Accordingly, the overall size of LED display tile 100 can vary depending on the arrangement and pitch of LEDs 112.

Control module 120 includes the control electronics for managing the overall operations of LED display tile 100. Namely, any lighting content, digital image content, and/or digital video content to be presented using LED display tile 100 is stored locally in and managed by control module 120. Using control module 120, a main feature of LED display tile 100 is that it is absent any signal cables. More details of control module 120 are shown and described with reference to FIG. 3.

In one example, power module 150 provides battery power to LED display tile 100, such as a non-rechargeable or rechargeable battery. Namely, power module 150 may include a rechargeable battery that can be recharged using solar or standard power. In another example, power module 150 may include a power transmitter and receiver, such as an electromagnetic induction power transmitter and receiver. Using power module 150, a main feature of LED display tile 100 is that it is absent any power cables. More details of control module 120 are shown and described with reference to FIG. 3.

Because LED display tile 100 provides (1) locally stored content that is managed internally using control module 120, (2) wireless communication requiring no physical signal cables, and (3) battery power requiring no physical power cables, a fully autonomous and independent LED display tile is provided that is on the one hand simple and low cost (i.e. does not require a complex and expensive support system and network) and on the other hand is easily portable and/or transportable.

Figure 3:
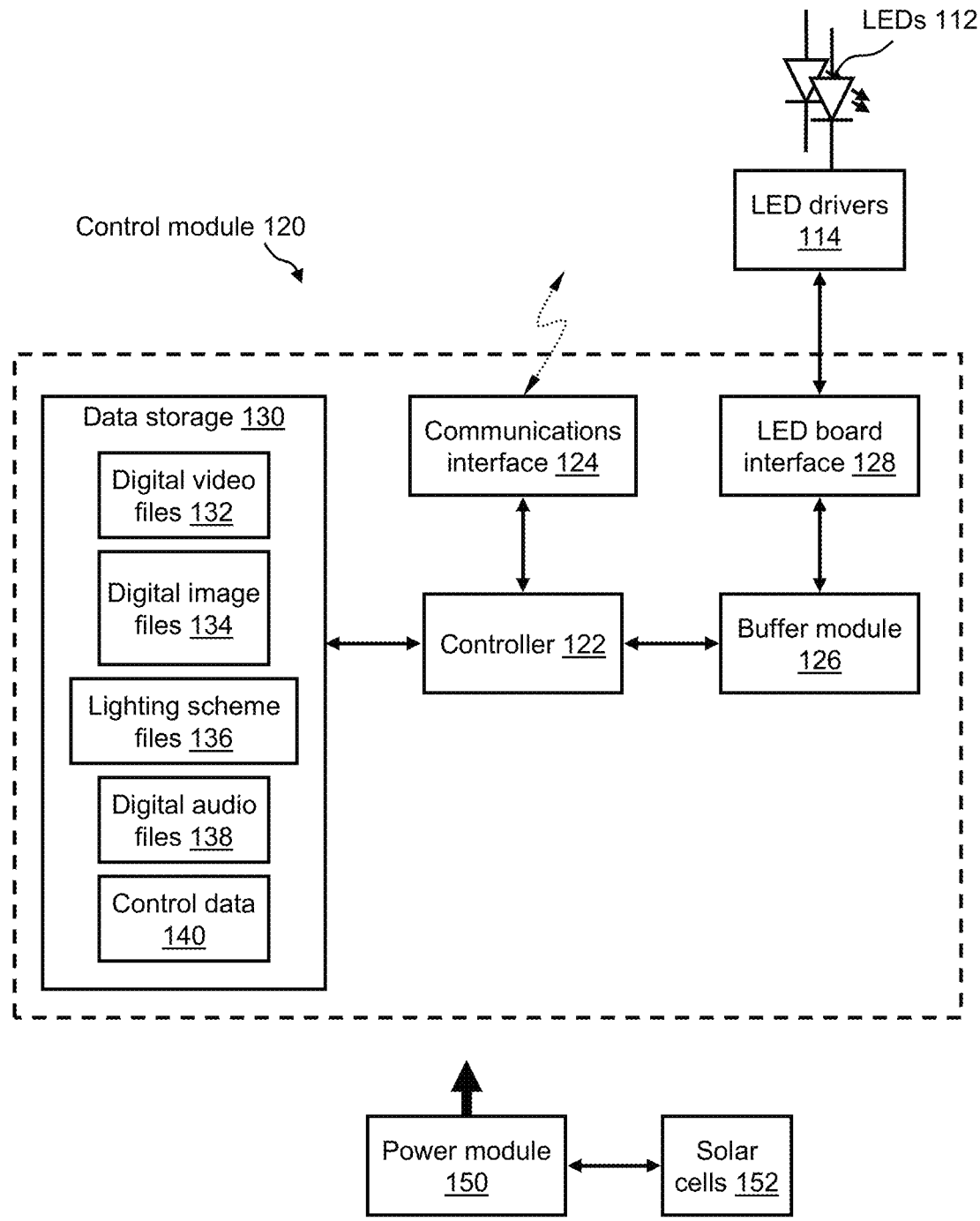
FIG. 3 illustrates a block diagram of an example of the control electronics of the presently disclosed standalone light-emitting element display tile, such as a standalone LED display tile.

FIG. 3 illustrates a block diagram of an example of the control electronics (e.g. control module 120) of the presently disclosed standalone light-emitting element display tile, such as a standalone LED display tile 100. In this example, control module 120 includes a controller 122, a communications interface 124, a buffer module 126, an LED board interface 128, and a quantity of data storage 130. Further, power module 150 supplies power to all the active components of control module 120.

Controller 122 can be any standard controller or microprocessor device that is capable of executing program instructions. Controller 122 manages the overall operations of LED display tile 100. In particular, controller 122 can be used to manage the content presented on LED display tile 100. Data storage 130 can be any volatile or non-volatile memory device. Data storage 130 can be built into or separate from controller 122. Further, data storage 130 can be any combination of onboard and portable memory, such as a secure digital (SD) card. An example of information stored in data storage 130 is digital video files 132, digital image files 134, lighting scheme files 136, digital audio files 138, and any type of control data 140. Control data 140 can be control information of any other devices, systems, and/or technologies that can be used in coordination with lighting applications as described hereinbelow with reference to FIG. 7 and FIG. 8. In one example, control data 140 can be control information for controlling and steering robotics (e.g. a robotic arm in projection systems).

Communications interface 124 may be any wired and/or wireless communication interface for connecting to a network (not shown) and by which information may be exchanged with other devices connected to the network. Examples of wired communication interfaces may include, but are not limited to, USB ports, RS232 connectors, RJ45 connectors, Ethernet, and any combinations thereof.

Examples of wireless communication interfaces may include, but are not limited to, an Intranet connection, Internet, cellular networks, ISM, Bluetooth® technology, Bluetooth® Low Energy (BLE) technology, Wi-Fi, Wi-Max, IEEE 402.11 technology, ZigBee technology, Z-Wave technology, 6LoWPAN technology (i.e. IPv6 over Low Power Wireless Area Network (6LoWPAN)), ANT or ANT+(Advanced Network Tools) technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols, such as, but not limited to, standard protocols for lighting control systems like DMX, ARTnet, DALI, KNX, CAN, ACN, and BACnet protocol. In one embodiment, sub-GHz (868 MHz or 915 MHz) modulation can be used for long distance wireless communication.

Buffer module 126 can be any video buffer device. In LED display tile 100, buffer module 126 is data storage (or memory) that is used to store video or graphics information as it moves from the renderer (e.g. controller 122) to the display screen (e.g. LED board 110). The output of buffer module 126 supplies LED board interface 128 that then passes information to LED drivers 114 on LED board 110. LED board interface 128 can be any type of physical and/or electrical connection between control module 120 and LED board 110.

Frame or body 116 of LED display tile 100 can include any design and/or mechanical fastening mechanisms for holding control module 120 and power module 150. In one example, control module 120 can be a custom printed circuit board (PCB). In another example, control module 120 can be a currently available single-board computer (SBC) or single-board system on a chip (SoC) platform that includes, for example, computer processing capability, data storage capability, wired communications capability (e.g. Ethernet), wireless communications capability (e.g. Wi-Fi, Bluetooth®), router capability, programmable input/output (I/O) capability, and the like.

In one example, control module 120 is implemented using the well-known Raspberry Pi 3 platform available from The Raspberry Pi Foundation (United Kingdom), see www.raspberrypi.org. However, control module 120 can be implemented using other single-board computers, such as, but not limited to, the Orange Pi PC 2 platform available from Shenzhen Xunlong Software CO., Limited (www.orangepi.org), and the Asus Tinker Board available from ASUSTeK Computer Inc. (Taipei, Taiwan). In another example, control module 120 can be a custom controller (e.g. microchip available from STMicroelectronics, flash microcontroller available from Renesas Electronics Corporation, and the like).

In some embodiments, individual LEDs 112 of LED display tile 100 or each LED display tile 100 as a whole may include a polarizer (e.g. 3D polarizer). For example, depending of the type of polarizer, a 3D image or another visual effect can be generated.

Figure 4:
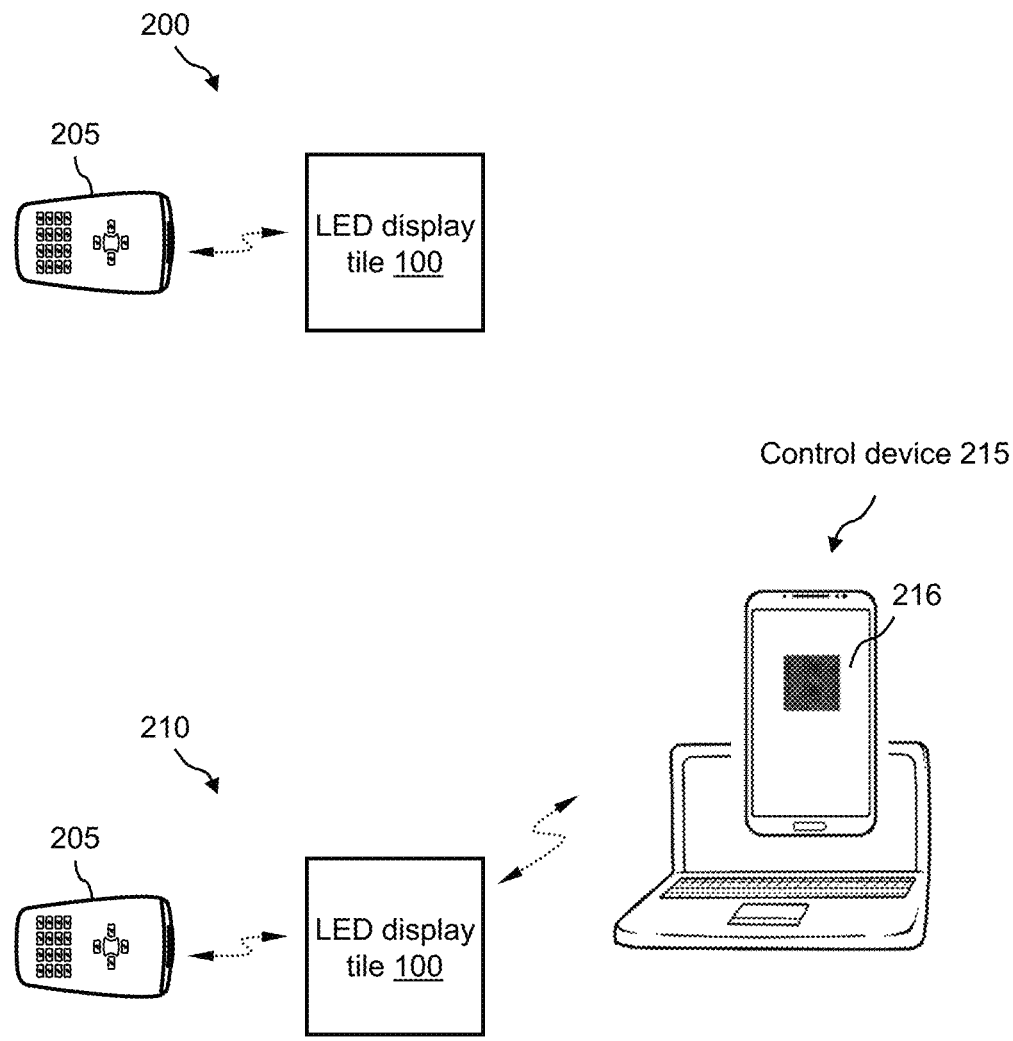
FIG. 4 shows examples of single-tile configurations of the presently disclosed standalone light-emitting element display tile, such as a standalone LED display tile.

FIG. 4 shows examples of single-tile configurations of the presently disclosed standalone light-emitting element display tile, such as a standalone LED display tile 100. For example, in a single-tile configuration 200, a single LED display tile 100 is provided in combination with a remote control device 205, such as an infrared (IR)-based remote control. In one example, a user preloads portable memory, such as an SD card, with content, such as one or more digital video files 132, digital image files 134, lighting scheme files 136, digital audio files 138, and/or any type of control data 140. Then, the user plugs the SD card into control module 120. Then, the user uses remote control device 205 to select the content to be displayed and initiate playout. In the case of digital video files 132, the selected digital video file 132 loops continuously until interrupted using remote control device 205. In the case of digital image files 134, the selected digital image file 134 displays continuously until interrupted using remote control device 205. Further, LED display tile 100 can be used as a lighting fixture, such as for backlighting in lightbox for displaying an advertising poster. In this case, the selected lighting scheme file 136 runs continuously until interrupted using remote control device 205.

Again, in one example, power module 150 can be a battery pack that includes a rechargeable battery. In one example, the rechargeable battery can be recharged using USB or a power bank. In another example, the battery pack can be removed periodically and recharged separate from LED display tile 100.

In yet another example, the rechargeable battery of power module 150 can be recharged using energy harvesting devices, such as, but not limited to, solar power, Pelletier, wireless harvesters, and the like. For example, one or more solar cells 152 may be integrated into the face of LED board 110, such as in between the LEDs 112. In this example, the rechargeable battery recharges during the day. Then, content can play out at night using the stored energy in the battery. Further, since the input voltage and current may vary according to light received by solar cells 152, the local processing device (e.g. controller 122 of control module 120) in LED display tile 100 can use this information to automatically adapt the light output, pulse-width modulation (PWM), and/or current settings in order to optimize the brightness and/or playing time of LED display tile 100.

In another example, in place of the rechargeable battery, power module 150 includes an integrated power supply unit (PSU), wherein the LED display tile 100 is connected to the AC grid.

Referring still to FIG. 4, in a single-tile configuration 210, a single LED display tile 100 is provided in combination with remote control device 205 as well as with a control device 215. Control device 215 can be any computing device that can communicate wirelessly (e.g. via Bluetooth®) with LED display tile 100. For example, control device 215 can be any mobile computing device, such as a mobile phone (i.e. a smartphone), a smartwatch, a tablet device, a laptop computer, and the like. Further, in the case of a smartphone or tablet device, a mobile app 216 may be installed and running on control device 215. Mobile app 216 can be, for example, an iOS mobile app for an Apple iPhone or an Android mobile app for an Android phone. Mobile app 216 can be used, for example, to load content onto LED display tile 100, to read the content already loaded on LED display tile 100, and/or to select and initiate the desired content to be displayed.

In one example, control device 215 is used to wirelessly transmit content to data storage 130 of control module 120. Then, the user uses either remote control device 205 or control device 215 to select the content to be displayed and initiate playout. In one embodiment, the functionality of remote control device 205 can be entirely taken over by control device 215 (and its mobile app 216). Once the content is launched on LED display tile 100, control device 215 can be removed while LED display tile 100 runs independently. In some embodiments, at a later time a control device 215 different from the original control device 215 can be used with a certain LED display tile 100. In some embodiments, multiple control devices 215 can be used with a certain LED display tile 100.

Figure 5:
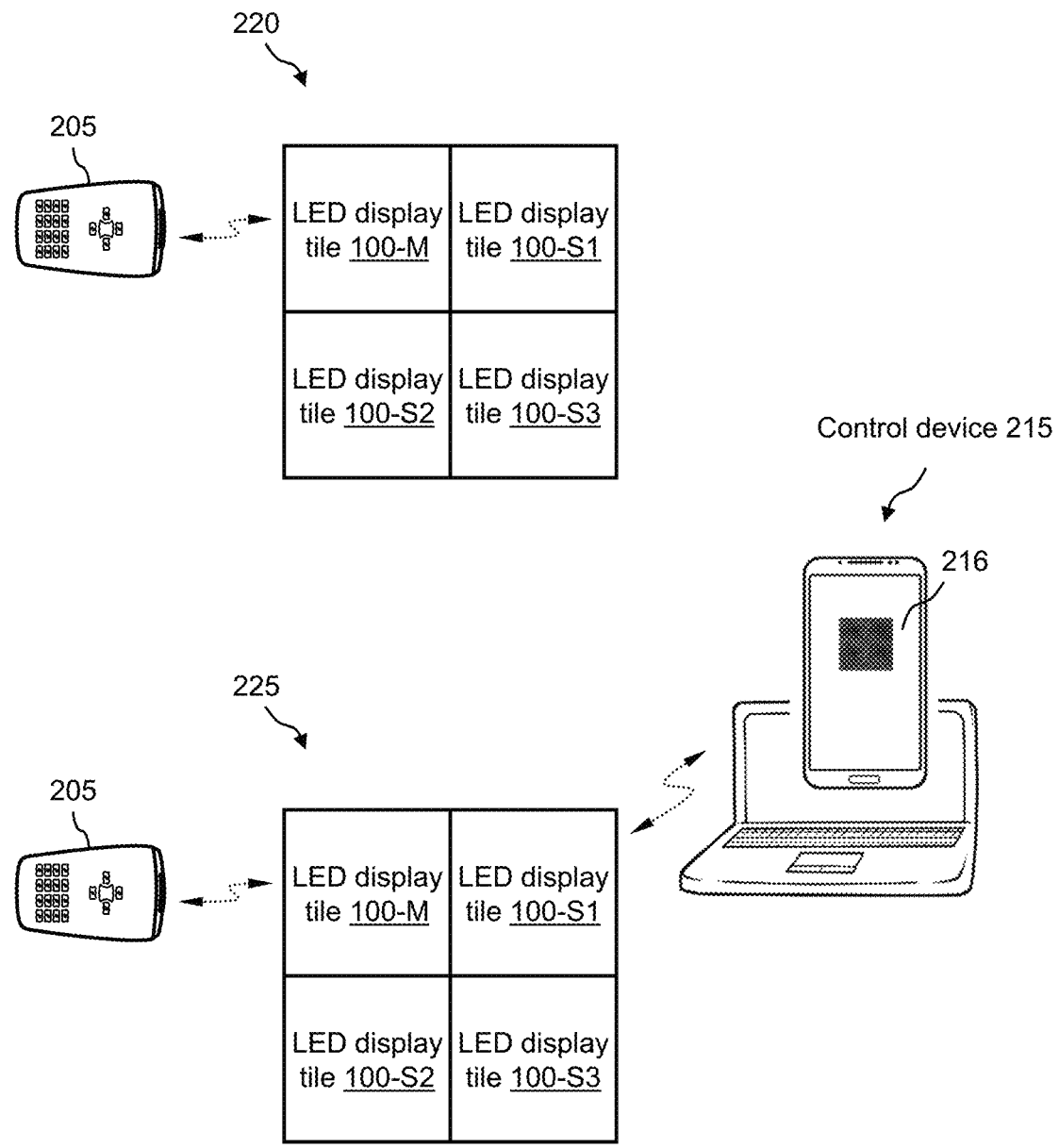
FIG. 5 shows examples of multiple-tile configurations of the presently disclosed standalone light-emitting element display tile, such as a standalone LED display tile.

FIG. 5 shows examples of multiple-tile configurations of the presently disclosed standalone light-emitting element display tile, such as a standalone LED display tile 100. For example, in a multiple-tile configuration 220, multiple LED display tiles 100 are provided to form a larger display. Namely, in LED display tile 100, "display tile" means displays that can be arranged side-by-side while maintaining the pixel pitch across the display tile boundaries. In this way, multiple LED display tiles 100 can be arranged together seamlessly to form a larger display. A 2×2 arrangement of LED display tiles 100 is shown in FIG. 5. However, this is exemplary only. Any number and arrangements of LED display tiles 100 is possible.

Multiple-tile configuration 220 shows multiple LED display tiles 100 in combination with remote control device 205 and a multiple-tile configuration 225 shows multiple LED display tiles 100 in combination with remote control device 205 and control device 215. In any multiple-tile configuration of LED display tiles 100, one of the LED display tiles 100 is set as the "master" tile while the remaining LED display tiles 100 are set as the "slave" tiles. For example, FIG. 5 shows four LED display tiles 100—the master tile which is LED display tile 100-M, then the slave LED display tiles 100-S1, 100-S2, and 100-S3. The master LED display tile (e.g. LED display tile 100-M) can be set automatically via programming in controller 122 of control module 120 or set manually, for example, by setting a switch (not shown) on control module 120, wherein the state of the switch can be interrogated by controller 122.

In this example, LED display tile 100-M controls itself and the slave LED display tiles 100-S1, 100-S2, and 100-S3. In operation, LED display tiles 100-M, 100-S1, 100-S2, and 100-S3 receive their content to be played. For playing video, the video frames of all the LED display tiles 100-M, 100-S1, 100-S2, and 100-S3 need to be synchronized so that every frame on every tile is updated simultaneously. LED display tile 100-M is used to manage the synchronization by processing the sync signals between tiles.

Namely, LED display tile 100-M transmits a sync signal periodically (e.g. every 16.66 ms (or 60 hz)) to LED display tiles 100-S1, 100-S2, and 100-S3 so that each tile can play out exactly the same frame of the video. In one example, the full video content can be stored at each of the four LED display tiles 100-M, 100-S1, 100-S2, and 100-S3. That is, LED display tiles 100-M, 100-S1, 100-S2, and 100-S3 are loaded with the same content (i.e. global content). "Global" means that every LED display tile 100 has the same content stored therein and then processes the content locally to extract out the portion to be displayed. However, in another example, the video content can be preprocessed and split into multiple different parts (i.e. dedicated content), wherein each part correlates to a certain LED display tile 100-M, 100-S1, 100-S2, and 100-S3. Then, each of LED display tiles 100-M, 100-S1, 100-S2, and 100-S3 plays its corresponding portion of the video content.

In some embodiments, the synchronization process can be managed by control device 215 rather than by a master LED display tile 100. In this scenario, control device 215 may be used, for example, to (1) preprocess the video content, image content, and/or the lighting content for the multiple LED display tiles 100, (2) transmit content and control information to the multiple LED display tiles 100, and (3) once running (or playing content) to transmit the sync signal to the multiple LED display tiles 100.

In some embodiments, there is built in mechanisms for ensuring reliable operation of multiple-tile configurations. For example, in the event that the master tile (e.g. LED display tile 100-M) fails, a new master tile can be determined amongst the slaves by means of a particular protocol operating amongst the slave tiles. For example, if the slave tiles have not received a synchronization signal from the master tile for some predetermined amount of time, a new master tile can be determined amongst the slave tiles by means of a particular protocol operating amongst the slave tiles. This fall back procedure is also referred to as "no single failure" operation, meaning that despite the master tile failing the overall system will not fail.

Further, whereas each of the LED display tiles 100 may include a power transmitter and receiver, adjacent LED display tiles 100 can charge automatically in a chained manner by transferring energy from one tile to the next, for example, by means of electromagnetic induction techniques.

According to an embodiment, an antenna system is provided for ensuring that the LED display tiles receive a synchronization signal preferably all simultaneously. Moreover, within the synchronization signal, current frame and/or video number are possibly embedded such that each tile knows what is to be played. Multiple short video files of a few seconds or minutes are for example stored on the LED display tiles. The synchronization signal will ensure that each tile will play the right video at the right time. Further, by means of example, a computer could submit a signal to the antenna or radio in a timed manner for initiating the signaling process.

While referring to fixed install business for example, a master tile is transmitting for synchronization to the other slave tiles, until for example a new advertisement sequence needs to be uploaded. In an embodiment, the content could be uploaded via Bluetooth and/or Wi-Fi from a smartphone. In case we would make the communication protocol ACN or ARTnet, and/or DMX compatible, the LED display tile could even be controlled via lighting consoles in the rental and staging world. Moreover referring further to rental and staging business, an intermediate step could be provided wherein the lighting console is interfaced with the antenna system processing the scan, ARTnet and/or DMX commands into usable signals for the LED display tile. The LED display tile can then serve as lighting device, including showing video depending on the DMX channels as programmed by a (human) lighting operator.

According to a further embodiment, an environment e.g. sports stadium is considered with multiple LED display tiles each held by one individual person. Suppose now that there is no synchronization signal provided, although each LED display tile can receive and transmit signals. Taking into account the position and more in particular the proximity of tiles amongst each other, the content of the tiles can still be manipulated in some way, even real-time. For example, when a person with a LED display tile T1 is approaching another person with a LED display tile T2, the content of either tile T1 or tile T2, or of both tiles T1 and T2 could be adaptively changed, for instance in such a way that e.g. only the color or the entire content of the image is changed.

Figure 6:
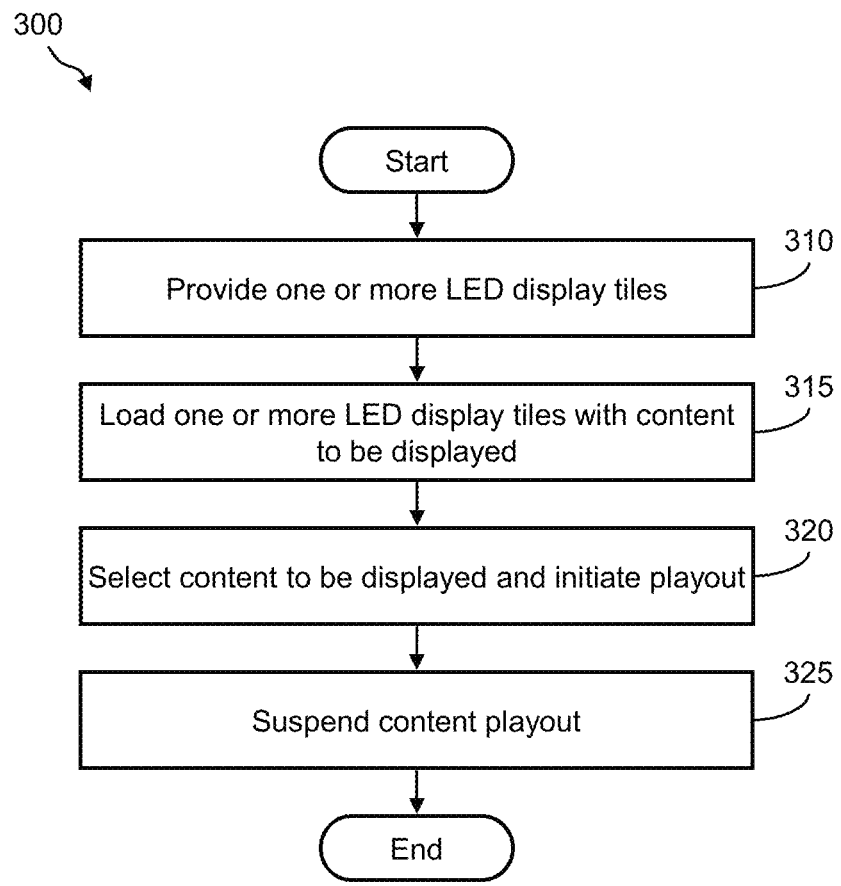
FIG. 6 illustrates a flow diagram of an example of a method of using the presently disclosed standalone light-emitting element display tile, such as a standalone LED display tile.

FIG. 6 illustrates a flow diagram of an example of a method 300 of using the presently disclosed standalone light-emitting element display tile, such as a standalone LED display tile 100. Method 300 may include, but is not limited to, the following steps.

At a step 310, one or more LED display tiles 100 are provided. In one example, one LED display tile 100 is provided according to single-tile configuration 200 or 210 shown in FIG. 4. In another example, multiple LED display tiles 100 are provided according to multiple-tile configuration 220 or 225 shown in FIG. 5.

At a step 315, the one or more LED display tiles 100 are loaded with content. In one example, a user preloads portable memory, such as an SD card, with content, such as one or more digital video files 132, digital image files 134, lighting scheme files 136, digital audio files 138, and/or any type of control data 140. Then, the user plugs the SD card into control module 120. In another example, control device 215 (e.g. smartphone, smartwatch, tablet device, laptop computer) is used to wirelessly transmit content to data storage 130 of control module 120.

At a step 320, the content to be displayed is selected and then playout is initiated. For example, the user uses remote control device 205 or control device 215 to select the content to be displayed and initiate playout.

At a step 325, the content that is being displayed is suspended. For example, the user uses remote control device 205 or control device 215 to suspend playing the content.

In method 300, the presence and/or use of an external processing device/module with the one or more LED display tiles 100 is used optionally in step 315 only. Otherwise, at steps 320 and 325, while the one or more LED display tiles 100 are running (or playing content), there is no requirement for an external processing device/module.

Figure 7:
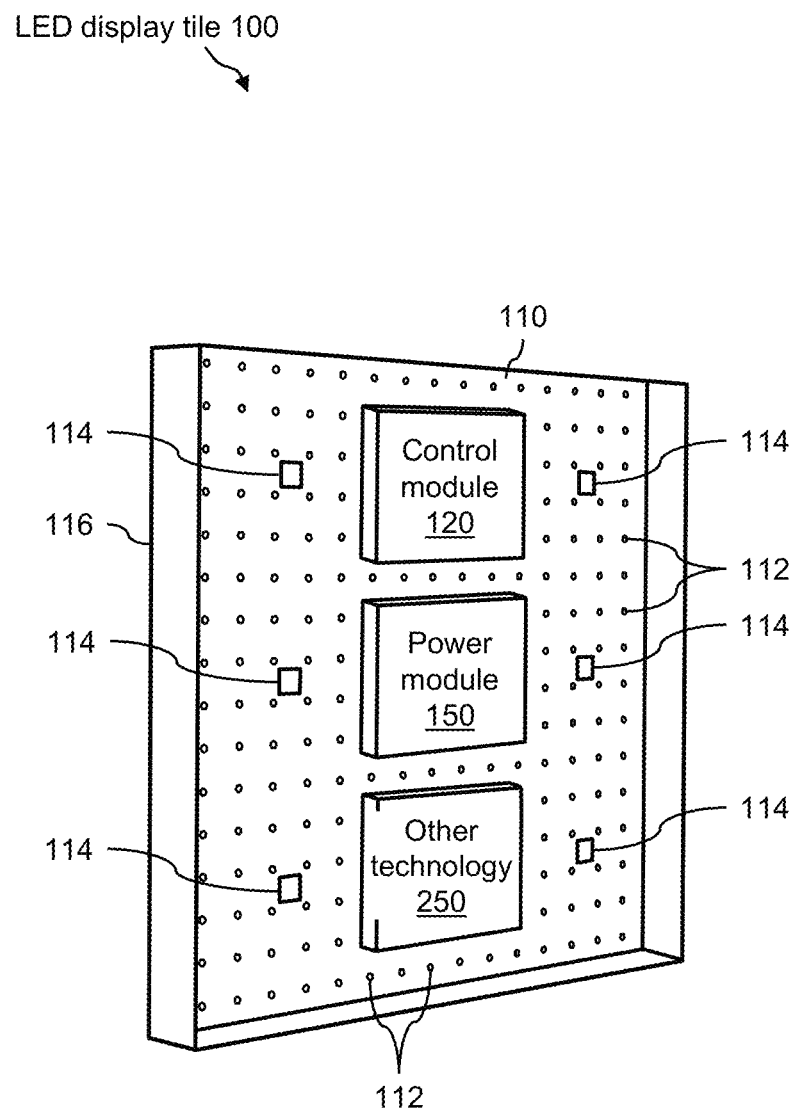
FIG. 7 illustrates a rear perspective view of an example of the presently disclosed standalone light-emitting element display tile, such as a standalone LED display tile that includes other onboard technology.

FIG. 7 illustrates a rear perspective view of an example of the presently disclosed standalone light-emitting element display tile, such as a standalone LED display tile 100 that includes other onboard technology, for example, other technology 250 that is built into LED display tile 100. Other technology 250 can be, for example, any other devices, systems, and/or technologies and any combinations thereof that can be used in coordination with lighting applications, such as the presently disclosed standalone light-emitting element display tile, such as a standalone LED display tile 100. In one example, other technology 250 can be built in audio devices (e.g. speakers). In this example, the "playlist" of LED display tile 100 may include both digital video files 132 and digital audio files 138 so that LED display tile 100 can playout both video and its corresponding audio. "Playlist" means, for example, a collection of data (or content) stored to be played or to have running on the LED display tile 100, or to actuate the LED display tile 100 (cfr. Robotics).

In another example, other technology 250 can be built in motors of a robotics system. In this example, LED display tile 100 can playout video and its corresponding audio along with motor instructions that can actuate one or more motors built into or attached to LED display tile 100. These motors of the robotics system can, for example, make LED display tile 100 move in 3D space. In this example, the "playlist" of LED display tile 100 may include digital video files 132, digital audio files 138, and motor control data 140 so that LED display tile 100 can playout video, playout audio, and move in 3D space. In this way, one can imagine LED display tile 100 playing out video, playing out audio, and making itself move.

Figure 8:
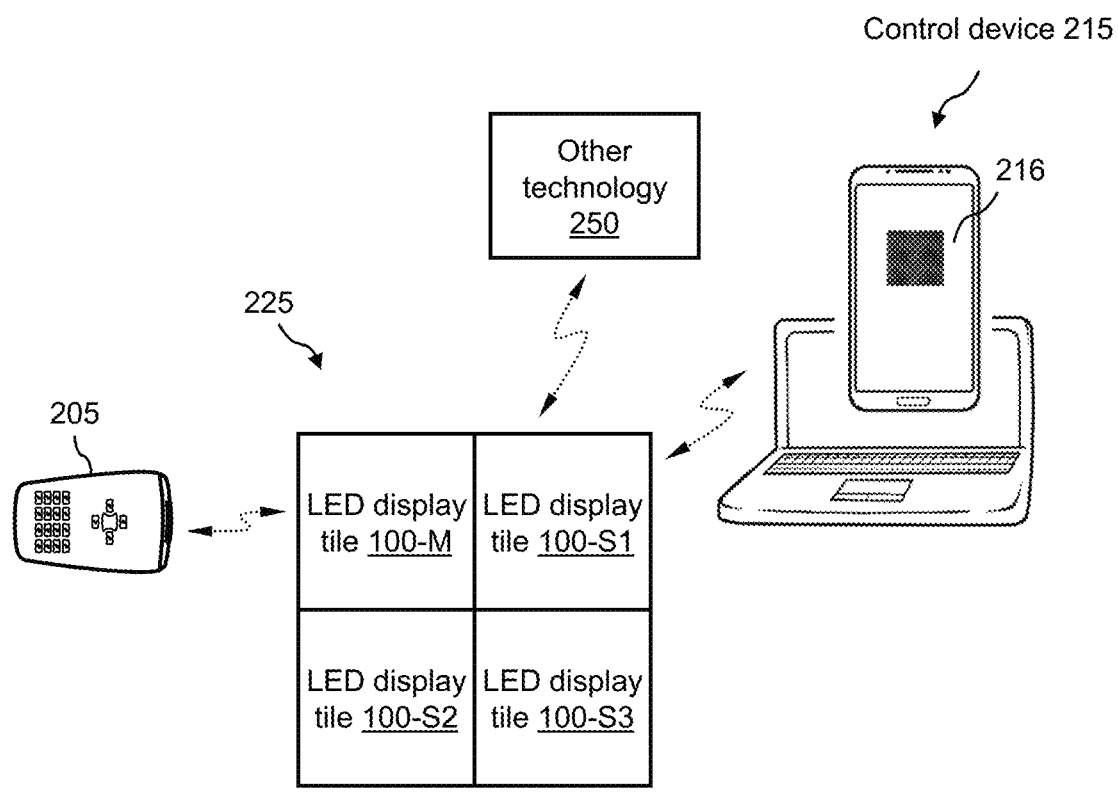
FIG. 8 shows an example of a multiple-tile configuration of the presently disclosed standalone light-emitting element display tile, such as a standalone LED display tile in communication with other separate technology.

FIG. 8 shows the multiple-tile configuration 225 shown in FIG. 5 and an example of the multiple LED display tiles 100 in communication with other technology 250 that is separate from the multiple LED display tiles 100. As described with reference to FIG. 7, other technology 250 can be, for example, any other devices, systems, and/or technologies and any combinations thereof that can be used in coordination with lighting applications. In one example, other technology 250 can be an audio system and/or audio device connected wirelessly to, for example, LED display tile 100-M, wherein LED display tile 100-M supplies digital audio files 138 to the audio system for playing in coordination with the video running on LED display tiles 100. In another example, other technology 250 can be a robotics system wherein, for example, each LED display tile 100 or groups of two or more LED display tiles 100 can be manipulated via robotic arms. In this example, each of the LED display tiles 100 may be connected wirelessly to its corresponding robotic arm wherein motor control data 140 is used to control the movement of the robotic arm in coordination with the video running on the corresponding LED display tile 100.

Referring now again to FIG. 1 through FIG. 8, features of the presently disclosed standalone light-emitting element display tile, such as a standalone LED display tile 100 may include, but are not limited to, the following—a cableless display; low cost; no local processing; wireless communications; master tile capability; sync signal capability; double calibration and calibration in case of RGB LEDs; voltage to LEDs <5V (low power); sub-GHz wireless communications for long distance; wide range from 1 pixel/tile to 500×500 pixels/tile; DMX, ARTnet, and ACN control; local flash or SD card (hard disk); content can be tile dedicated or global; any color LEDs, energy harvesting devices for power; fully autonomous (i.e., no signal or power cables); and portable, handheld, and/or wearable.

Figure 9:
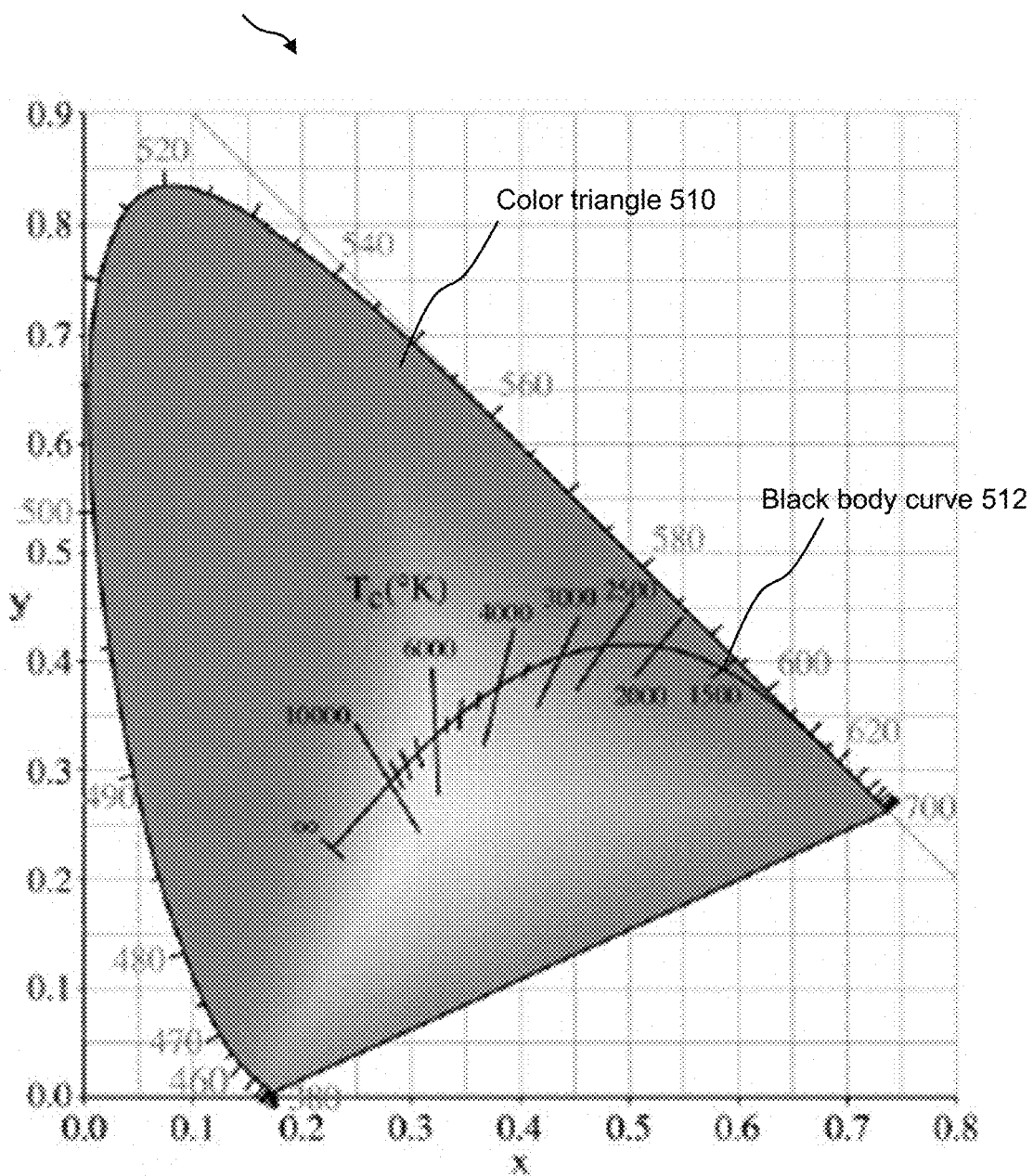
FIG. 9 illustrates a chromaticity diagram (for reference only).

FIG. 9 illustrates a chromaticity diagram 500, which is provided as a reference for the discussion to follow with regard to the presently disclosed standalone light-emitting element display tile, such as a standalone LED display tile 100. As is well known, a chromaticity diagram, such as chromaticity diagram 500, is a triangular-shaped line that connects the chromaticities of the spectrum of colors. In the case of chromaticity diagram 500, this line defines a color triangle 510. The curved line within color triangle 510 of chromaticity diagram 500 shows where the colors of the spectrum lie and is called the spectral locus. In particular, a black body curve 512 is the spectral locus for white light. Combinations of colors, such as shades of blue, green, yellow, orange, and red, along black body curve 512 mix and produce white light. The wavelengths along black body curve 512 are indicated in nanometers. Furthermore, FIG. 9 shows the range of CTs along the length of black body curve 512. For example, the end of black body curve 512 that is near the blue area indicates a CT of 30000K (cool light) and approaches infinity. By contrast, the end of black body curve 512 that is near the red area indicates a CT of 2500K (warm light) and approaches zero. Additionally, those skilled in the art will understand that the more colors of the spectrum that are present with sufficiently high energy levels within a white light source, the higher the CRI (color rendering index) of the white light source and, thus, the higher the quality of the white light.

Referring still to FIG. 9, it is well known in the color industry that quantitative figures for colors and wavelengths of visual colors is not very straight forward. Numerous examples of refinement exist, but still generic formulas for defining a human "perceived" color do not exist. Several attempts have been made and one of the most know is the CIE 1931 color space, but regardless of these attempts, influence of narrow band versus wide band color emitters, brightness difference to color perception of human eye is different.

It can be easily demonstrated that totally different colors measured, for example, using a spectrometer in the CIE 1931 color space, with different brightness are perceived almost exactly the same for the human eye. In that regard, (narrow band) colors that are not perceived as saturated enough by the human eye can be closely matched with a less (narrow band) color emitter with different brightness. Accordingly, one can create for a display a perceptional color gamut expansion (e.g. a color with Brightness A in the CIE1931 chart of (0,14;0,8) can be perceived exactly the same as color (0,13;0,65) with brightness B), which is perceived as much more saturated color.

In case of an RGB display, such as the presently disclosed standalone light-emitting element display tile, such as a standalone LED display tile 100, (but this method is not exclusive to RGB displays only), changing the saturated color points also changes the white point of the display. It speaks for itself that we want the original white point not to change.

Accordingly, a method is provided of holding the white point of the display. Namely, in a first step, when showing the saturated color, show the "perceived saturated color." In a second step, when showing white, then show the saturated color as is. In a third step, for every color in between first and second step, apply a weight factor dependent on the content. This weight factor determines how much "value" needs to be attributed to the "perceived color" and the "real saturated color". For example, when color is purely the saturated color to be shown, the weight factor=1. The general formula is for example: saturated color*weight factor+(1−weight factor) *non saturated color. Further, by means of example, suppose blue is not working well and therefore decreased in brightness, but therewith giving another color impression. The brightness will then be compensated such that the right blue color impression is given again. In case of white this brightness compensation should be cancelled out entirely. When a mixed color is presented wherein blue is included, then the compensation will be somewhere in between and hence will not be fully active as in blue, neither will it be fully cancelled as in white. The example of blue is mentioned in particular whereas the human eye may react very strangely on the color blue.

Further, with respect to power module 150 of the presently disclosed standalone light-emitting element display tile, such as a standalone LED display tile 100, certain techniques can be applied for extending the operational lifetime of batteries. For example, LED display tile 100 can run standalone using a battery pack (e.g. power module 150). This battery pack can consist of rechargeable batteries, such as Li-ion cells. For lower power applications, a Lithium coin cell pack can be used. Although also important for a standard Li-ion pack, the below described procedure is more focused on using lithium coin cells as the proposed method and invention may have its biggest impact on lithium coin cells (nevertheless, it can be certainly used for standard battery packs). As an example of such lower power application using a Lithium coin cell pack, a LED wristband may be referred to.

It is well known in the industry that for Li-ion cells voltage over the battery is an indication of the total charge of the battery (standard Li-ion cells operate between 2.7V and 4.2V, whereby 4.2V is full charge). Although similarities exist, there is a factor that has become very important when using lithium coin cells. Depleting a battery with a certain current A compared to depleting a battery with 2A current is totally different. 2A depletion doesn't mean the battery gets depleted much faster, but extremely faster. This is due to the reduced thickness of the battery and the chemical annealing process cannot recover fast enough. Details of this particular behavior have been studied and documented, such as in "Performance characteristics of Li-ion cell for use in wireless sensing systems"—"Yin Zhang, 20112—department of chemical engineering; Brigham Young university."

Deduction of the theory shows that depleting batteries with a constant current A (and A being above a certain chemical threshold of the battery construction) depletes the battery extremely fast. However, depleting the battery with current 3×A in time B and with a "dead" time being 3×B has a much better effect on lifetime. In this 3×B period or longer, the battery chemistry has annealing time whereas in the constant A time it has not. This means that the battery system has a pivot current draw point (i.e. the point when exceeds, the lifetime is not linear anymore with drawn current).

The below described methods are examples on how the display driving electronics of, for example, the presently disclosed standalone light-emitting element display tile, such as a standalone LED display tile 100 can be made to extend the "visual" lifetime of this particular display. Note: these methods are also valid for audio and the like. The fact that audio and video intensity/brightness is nonlinear also helps on the visuals/audible perception (e.g. perceived visual brightness to 50% is in fact 25% on real power).

Figure 10:
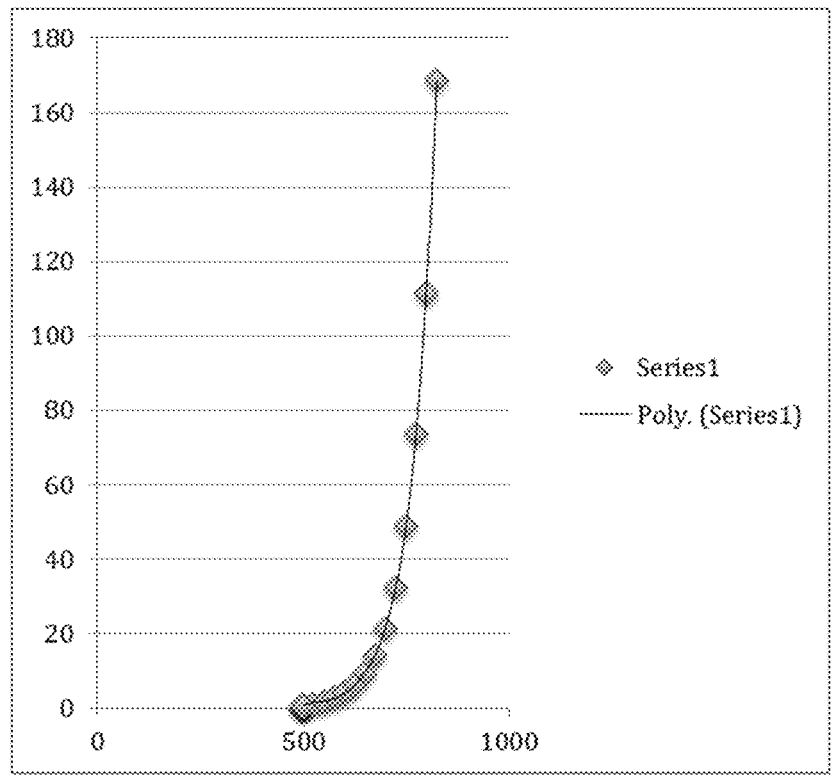
FIG. 10 illustrates a plot of a measure for degree of power to the light-emitting elements, here e.g. LEDs in function of a measure for the voltage over the battery, for a standalone LED display tile in accordance with the invention.

Methods for Extending Lifetime
1. Characterization of the battery set.
   a. Determine max Voltage
   b. Determine min voltage
   c. Determine pivot current point (A)
   d. Determine annealing time tB for a reference current B.
2. Implementation of led driving electronics
   a. Processing devices which must be always active must draw less than A.
   b. In case a, is not possible, make sure the device then runs in on/off state whereby annealing time >tB
   c. For led and audio, implement a PWM circuit. The PWM bit depth must be high enough for the desired performance, e.g. 12 bit.
3. Implementation A and referring now to plot 400 shown in FIG. 10—case of battery voltage can be measured.
   a. At certain intervals measure battery voltage.
   b. Dependent on the values determined in 1, apply a multiplication factor to the total PWM desired.
   c. The multiplication factor can be linear, but exponential functions may be applied as well and give (obviously) much more lifetime (e.g. when battery voltage measured=max voltage, then multiplication factor=1; when battery voltage=min voltage, multiplication factor=0,001).
4. Implementation B—no voltage measurement possible
   a. This implementation requires some memory. At startup determine total on time of the colors.
   b. Accumulate the total on time
   c. This total on time is function of the voltage over the battery.
   d. Then implement step also determined in 3
5. Alternative/extra functions.
   a. In case of LEDs R/G/B additional visual factors can be applied to extend lifetime.
   b. When showing RGB, reduce total current for individual LEDs to ⅓, so that total current when showing R is the same and RGB.
   c. This is just an example and all kinds of variations exist.
   d. (analogy with sound is when using 2 or more audio channels.)

The invention claimed is:
1. A standalone display system comprising:
   a portable board;

an arrangement of a plurality of light-emitting elements on said portable board;

a plurality of light-emitting element drivers on said portable board, one of the plurality of light-emitting element drivers being assigned for each of said plurality of light-emitting elements;

a control system on said portable board for controlling said light-emitting element drivers, wherein said control system comprises a non-volatile data storage for storing data to be displayed as a video and/or images, a board communication system connectable to said plurality of light-emitting element drivers, and a controller, adapted for controlling said board communication system and said data storage; and a cable-free power supply on said portable board for supplying power to both said plurality of light-emitting element drivers and said control system;

wherein the display system is a standalone display system configured to operate fully autonomously without requiring connections outside the display system while displaying the video and/or images due to the data to be displayed being directly stored in advance into the non-volatile data storage of the display system and/or the display system is configured to operate fully independently in terms of operational logic;

wherein said board communication system comprises a board interface that passes the data to be displayed to said light-emitting element drivers and a buffer connected thereto, said buffer used to store the data to be displayed, as it moves from said controller to said board interface;

wherein said control system further comprises a wireless communications interface that provides wireless communications and wherein said controller is further adapted for controlling said communications interface; and wherein said standalone display system is adapted to wirelessly transmit synchronization signals to at least one other of a multi-tile configuration comprising a plurality of such standalone displays, each of the plurality of such standalone displays being further adapted to wirelessly receive such synchronization signals, wherein said standalone display system is adapted for operating as master tile amongst the other of said plurality of such display systems being determined as slave tiles.

2. The display system of claim 1, wherein said control system is further adapted for being in communication via said communications interface with a remote control device for receiving control data for use by said controller and/or for being stored into said data storage.

3. The display system of claim 1, wherein said controller of said control system is adapted for being temporarily in communication via said communications interface with an external processing device for loading data into said data storage, for storing the data to be displayed.

4. The display system of claim 3, wherein said controller of said control system is adapted for handling such temporary communication when the external processing device is a general-purpose processing device.

5. The display system of claim 1, wherein said power system comprises an energy storage, being all or not rechargeable.

6. The display system of claim 1, further comprising another technology system used in combination with light-ing and/or display functionality of said display system, said controller being adapted for operating said other technology system.

7. The display system of claim 6, wherein said other technology system is an audio system, said data storage being further adapted for storing digital audio files.

8. The display system of claim 1, wherein said plurality of light-emitting element drivers are mounted on the back of said portable board; and said control system and/or power supply are installed behind said portable board.

9. A single-tile configuration comprising the display system in accordance with claim 1 and a remote-control device for providing control data to said display system, the display system being in wireless communication with said remote control device.

10. The single-tile configuration comprising the display system in accordance with claim 1 and an external processing device, wherein said display system is in wireless communication with said external processing device to wirelessly transmit video data and/or audio and/or control data to said data storage of said control system.

11. The single-tile configuration consisting of the display system in accordance with claim 1, and an external processing device, wherein said display system is in wireless communication with said external processing device to wirelessly transmit video data and/or audio, and/or control data to said data storage of said control system.

12. A multiple-tile configuration comprising multiple display systems in accordance with claim 1, further comprising remote control devices and/or external processing devices, each being in wireless communication.

13. A multiple-tile configuration comprising multiple standalone display systems, each of the standalone display systems comprising:

a portable board;

an arrangement of a plurality of light-emitting elements on said portable board;

a plurality of light-emitting element drivers on said portable board, one of the plurality of light-emitting element drivers being assigned for each of said plurality of light-emitting elements;

a control system on said portable board for controlling said light-emitting element drivers, wherein said control system comprises a non-volatile data storage for storing data to be displayed as a video and/or images, a board communication system connectable to said plurality of light-emitting element drivers, and a controller, adapted for controlling said board communication system and said data storage; and a cable-free power supply on said portable board for supplying power to both said plurality of light-emitting element drivers and said control system;

wherein the display system is a standalone display system configured to operate fully autonomously without requiring connections outside the display system while displaying the video and/or images due to the data to be displayed being directly stored in advance into the non-volatile data storage of the display system and/or the display system is configured to operate fully independently in terms of operational logic;

wherein said board communication system comprises a board interface that passes the data to be displayed to said light-emitting element drivers and a buffer connected thereto, said buffer used to store the data to be displayed, as it moves from said controller to said board interface; and wherein said control system further comprises a wireless communications interface that provides wireless communications and wherein said controller is further adapted for controlling said communications interface wherein the multiple-tile configuration further comprises remote control devices and/or external processing devices, each being in wireless communication, and wherein at least one of said multiple display systems is adapted to wirelessly transmit synchronization signals to at least one other of said multiple display systems that is further adapted to wirelessly receive such synchronization signals, wherein said at least one of said multiple display systems is adapted for operating as master tile amongst the other of said multiple display systems being determined as slave tiles.

14. The display system of claim 1, wherein said power supply comprises a power transmitter and receiver.

15. The display system of claim 1, wherein said power transmitter and receiver includes an electromagnetic induction power transmitter and receiver.

16. The display system of claim 1, wherein said buffer is physically separated from said non-volatile data storage.

17. The display system of claim 1, wherein said controller includes a standard controller or microprocessor device.

18. The display system of claim 1, wherein the display system is a standalone display system configured to operate fully autonomously without requiring connections outside the display system while displaying the video and/or images due to the data to be displayed being directly stored in advance into the non-volatile data storage of the display system.

19. The display system of claim 1, wherein the display system is configured to operate fully independently in terms of operational logic.

20. The display system of claim 1, wherein the display system is a standalone display system configured to operate fully autonomously without requiring connections outside the display system while displaying the video and/or images due to the data to be displayed being directly stored in advance into the non-volatile data storage of the display system, and wherein the display system is configured to operate fully independently in terms of operational logic.

21. The display system of claim 1, wherein the display system is a standalone display system configured to operate fully autonomously without requiring connections outside the display system while displaying the video and/or images due to the data to be displayed being directly stored in advance into the non-volatile data storage of the display system, wherein once the data to be displayed is loaded to the display system, the display system is no longer required to be in communication with an external processing device, and wherein the controller is adapted for being temporarily in communication via the communications interface with an external processing device for loading the data to be displayed into the data storage module.

22. The display system of claim 21, wherein once the data to be displayed is loaded into the data storage module the controller is adapted to no longer be communication via the communications interface with the external processing device.

* * * * *